United States Patent [19]

Miyashita

[11] 4,282,990

[45] Aug. 11, 1981

[54] DISPENSER FOR GRANULAR MATERIAL

[76] Inventor: Kiyoshi Miyashita, 1328-6, Mitachi, Himeji-shi, Hyogo-ken, Japan

[21] Appl. No.: 927,902

[22] Filed: Jul. 25, 1978

[30] Foreign Application Priority Data

Aug. 6, 1977 [JP] Japan .......................... 52-105597[U]
Aug. 6, 1977 [JP] Japan .......................... 52-105598[U]
Apr. 28, 1978 [JP] Japan .......................... 53-059037[U]

[51] Int. Cl.$^2$ ...................... G01F 11/26; B65D 83/04
[52] U.S. Cl. .................................. 222/339; 206/540; 221/263; 221/288; 222/362; 222/456
[58] Field of Search ............... 221/288, 246, 263, 268, 221/276; 222/449, 425, 454, 456, 339, 362, 361, 533; 206/534.1, 534.2, 540

[56] References Cited

U.S. PATENT DOCUMENTS

| | | | |
|---|---|---|---|
| 2,472,871 | 6/1949 | Williamson | 221/263 |
| 2,748,995 | 6/1956 | Hightower et al. | 222/449 |
| 2,886,208 | 5/1959 | Sinclair | 221/288 |
| 3,016,170 | 1/1962 | Merkel | 222/425 |
| 3,042,256 | 7/1962 | Sanner | 206/534.2 X |
| 3,059,762 | 10/1962 | Yoshimoto | 206/540 |
| 3,289,885 | 12/1966 | Villaveces | 221/288 |

*Primary Examiner*—Robert J. Spar
*Assistant Examiner*—Edward M. Wacyra

[57] ABSTRACT

A dispenser for granular material includes a casing having an outlet for holding the material, a cap rockably mounted on top of the casing, and a spring for biasing the cap in a clockwise direction. The cap is formed with a groove into which a predetermined or desired amount of the material rolls when the dispenser is turned upside down. By returning it to its normal position and pressing down the front end of the cap, the groove will communicate with the outlet so that the predetermined amount of the material feeds out through the outlet.

5 Claims, 7 Drawing Figures

DISPENSER FOR GRANULAR MATERIAL

BACKGROUND OF THE INVENTION

The present invention relates to a dispenser or container for granular materials, such as food or medicine in the form of pills, pellets or the like, used to dispense a predetermined or desired amount of such material.

Various kinds of dispensers are known which include a cap and a casing having an outlet which can be opened by manipulating the cap and through which the material feeds out by tilting the dispenser. Such conventional dispensers have a disadvantage in that the amount dispensed by one tilting operation is not fixed but varies from time to time. Too much or too less material is often fed. This makes it necessary to check the amount each time and, if too much, to return the excess material into the dispenser. This is undesirable for sanitary reasons and is very inconvenient, e.g. to take a suitable amount of medicine or to use an appropriate amount of seasoning in cooking.

An object of the present invention is to provide a dispenser which enables a predetermined or desired amount of material to be dispensed easily with a single hand.

BRIEF DESCRIPTION OF THE DRAWINGS

Other objects and advantages of this invention will become apparent from the following description with reference to the accompanying drawings, wherein.

DETAILED DESCRIPTION OF THE INVENTION

Figure 1:
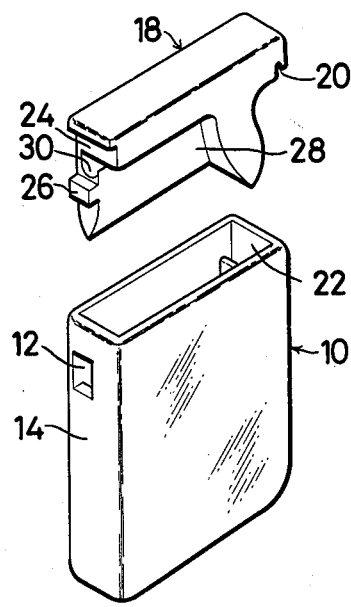
FIG. 1 is an exploded, perspective view of a first embodiment of this invention.
Figure 2:
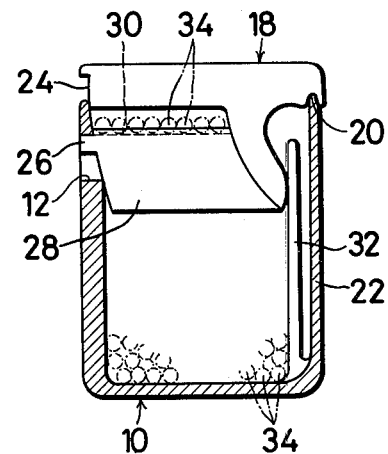
FIG. 2 is a vertical sectional side view of the dispenser of FIG. 1, showing the cap in its normal position.
Figure 3:
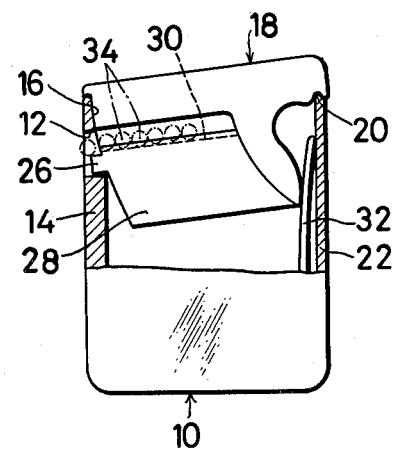
FIG. 3 is a partially cut-away side view thereof, showing the cap in its lower position.

Referring to FIGS. 1 to 3 showing the first embodiment, a casing 10 is made of a synthetic resin material so as to be transparent. The casing is open at its top and has an outlet 12 in its front wall 14. The inside of the front wall above the outlet 12 is formed with an arcuate surface 16.

A cap 18 is removably mounted in the casing 10, the cap being of such a width and length that it fits partially in the top of the casing. The cap 18 is formed at its rear bottom with a notch 20 to receive and engage the top of the rear wall 22 of the casing so that the cap is rockable about such top of the rear wall. The front surface 24 of the cap is formed to be arcuate to slide on the arcuate inner surface 16 of the casing. On the arcuate front surface of the cap there is provided a projection 26 which fits in and is vertically movable in the outlet 12. The projection and the outlet determine the angle through which the cap is rockable.

The cap 18 has formed in one side thereof a recess 28. As illustrated in FIG. 1, the recess becomes shallower as it rises, but, just above the projection 26, further recedes to form a horizontal groove 30 of U-shaped section to receive the granular material. The bottom of the groove is flush with the top surface of the projection. The length of the groove determines the amount of granular material which can be dispensed at a given time.

When the cap 18 is in its upper normal position as in FIG. 2, the groove 30 is horizontal and is closed by the front wall 14 of the casing. When it is in its lower position as in FIG. 3, the groove is inclined downwardly and forwardly and communicates with the outlet 12 to allow the granular material to roll along groove 30 and out of outlet 12.

An elastic member 32 such as a spring is mounted in the casing to engage the rear end of the cap 18 so as to urge it upwardly or in a clockwise direction. Member 32 may be integral with, and extends from the bottom of, the casing as illustrated, or it may be detachably mounted thereto.

In operation, after the casing 10 has been filled with pills or pellets 34, the cap 18 is mounted on the casing. To mount it, it is fitted in the casing and is pushed rearwardly against the bias of the spring 32. When it is released, the spring will push the cap forward until the projection 26 fits in the outlet 12 and the rear wall of the casing engages the notch 20. Now the projection prevents the cap from coming off the casing since the spring urges the cap clockwise.

When the dispenser thus assembled is turned upside down, the pills will roll on the recess 28 into the groove 30. Even after the dispenser has been returned to its normal position, the pills remain in the groove. A predetermined number of the pills are now arranged therein as in FIG. 2. When the front end of the cap is pressed down against the bias of the spring as in FIG. 3, the groove 30 communicates with the outlet 12 so that the pills feed out of the dispenser through the outlet. After all the pills in groove 30 have been dispensed, the cap 18 is released to allow the spring to bring it back to its original position so that the groove 30 is closed.

In FIGS. 4–7, like reference numbers designate like or corresponding parts throughout.

Figure 4:
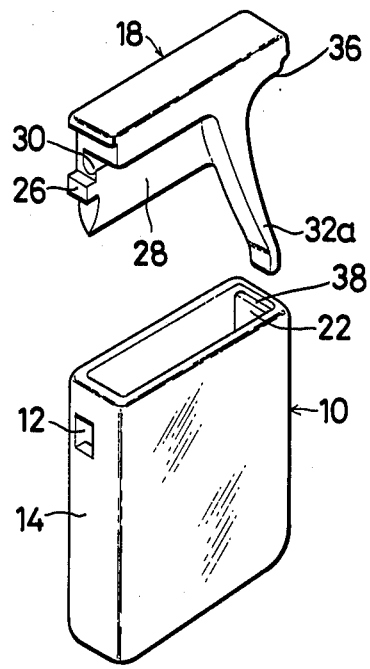
FIG. 4 is a view similar to FIG. 1 of a second embodiment.
Figure 5:
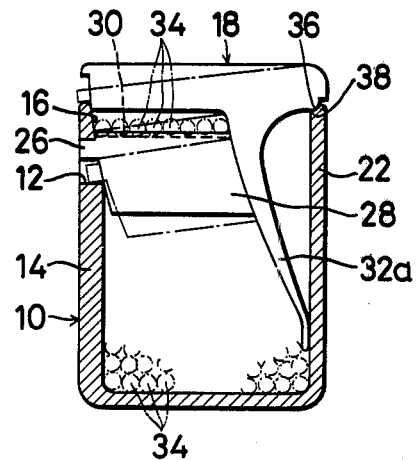
FIG. 5 is a vertical sectional side view thereof, with the cap shown in its lower position by dotted lines.

Referring to FIGS. 4 and 5 showing a second embodiment of the invention, the spring 32a is integrally mounted on the cap 18 instead of on the casing 10. A plate spring or the like may be detachably mounted on the cap instead, of course. As illustrated, the spring 32a extends downwardly and obliquely so as to engage the rear wall 22 of the casing. The length of the spring is such that when the cap is mounted on the casing, the spring is prestressed by the rear wall so as to normally urge the cap upwardly. This cap structure with an integral spring facilitates the manufacture of the dispenser and the mounting of the cap on the casing.

Another difference of the second embodiment from the first is that instead of the notch 20 the cap 18 is formed with a shoulder 36 adapted to bear on an indentation 38 in the top of the rear wall 22 of the casing.

Figure 6:
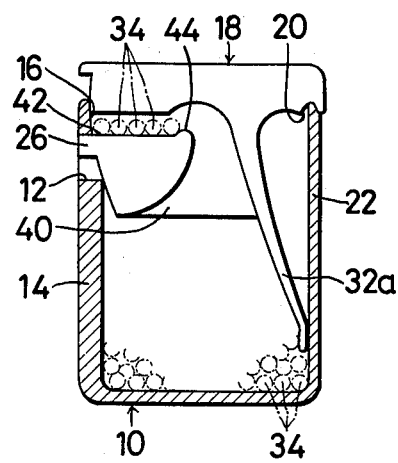
FIG. 6 is a vertical sectional side view of a third embodiment.
Figure 7:
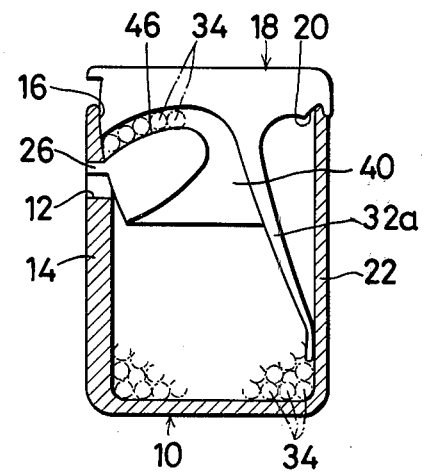
FIG. 7 is a vertical sectional side view of a fourth embodiment.

Referring to FIGS. 6 and 7 showing third and fourth embodiments of the invention, respectively, they are the same as the second embodiment except that the cap is provided with different structure for determining the amount of material dispensed by one action.

In the third embodiment of FIG. 6, the cap 18 is formed in one side thereof with a passage 40 widening towards the bottom. It becomes narrower as it rises, curves forwardly, and terminates in a horizontal groove 42 which is flush with the top surface of the projection 26. The length of the horizontal groove determines the amount of pills dispensed at a given time. At the rear end of the groove 42 there is provided a projection 44 to prevent the pills from spilling down back into the bottom of the casing.

In the fourth embodiment of FIG. 7, the passage 40 is similar to that in the third embodiment, but curves smoothly at its top in an arcuate shape slanting downwardly until it reaches the projection 26. The amount of the pills dispensed at a given time is determined by the shape of the arcuate groove or channel 46 of the passage 40.

The second, third and fourth embodiments may be used in the same manner as the first embodiment, that is, by turning the dispenser upside down, returning to its original position, and pressing the front end of the cap.

One feature of the fourth embodiment is that the amount of the pills dispensed at a given time is not fixed but is adjustable to some extent. Namely, when returning the dispenser to its normal position, as many pills as desired can be left in the arcuate groove 46 by adjusting the angle at which the dispenser is held.

In the third and fourth embodiments, though the passage 40, horizontal groove 42, arcuate groove 46 are open at one side, they may be closed at both sides.

It will be understood from the foregoing that a predetermined or desired amount of granular materials can be easily taken out of the dispenser according to the present invention.

While preferred embodiments have been described, it is to be understood that various changes may be made without departing from the scope of this invention.

I claim:

1. A dispenser for dispensing granular material, said dispenser comprising:
    a casing for holding granular material to be dispensed, said casing having an open top, a front wall having therein an outlet, and a rear wall;
    a cap mounted in said open top of said casing;
    said cap having a rear end engaging a top portion of said rear wall of said casing, such that said cap is rockable about said top portion between an upper non-dispensing position and a lower dispensing position;
    said cap having a front end with a projection extending therefrom, said projecting fitting into said outlet in said front wall of said casing, and said projection limiting the extent of rocking movement of said cap toward said upper non-dispensing position thereof;
    elastic means, within said casing, for urging said cap toward said upper non-dispensing position thereof;
    said cap having formed therein a groove dimensioned to receive therein a predetermined amount of granular material to be dispensed when the dispenser is turned upside down, said groove being positioned to open into and communicate with said outlet when said cap is depressed, against the urging force of said elastic means, into said lower dispensing position, thereby allowing the predetermined amount of granular material in said groove to be dispensed through said outlet, and said groove being positioned to be blocked from communication with said outlet when said cap is in said upper non-dispensing position thereof.

2. A dispenser as claimed in claim 1, wherein said cap has therein a recess extending from a bottom end of said cap to said groove, whereby the predetermined amount of granular material moves through said recess and into said groove when the dispenser is turned upside down.

3. A dispenser as claimed in claim 1, wherein said cap has therein a passage extending from a bottom end of said cap to said groove, said passage widening toward the bottom thereof, whereby the predetermined amount of granular material moves through said passage and into said groove when the dispenser is turned upside down.

4. A dispenser as claimed in claim 1, wherein said elastic means is integral with said casing.

5. A dispenser as claimed in claim 1, wherein said elastic means is integral with said cap.

* * * * *